United States Patent [19]

Shawhan

[11] 3,904,970

[45] Sept. 9, 1975

[54] LOCK-IN FILTER FOR NOISE REJECTION

[75] Inventor: Elbert N. Shawhan, West Chester, Pa.

[73] Assignee: Sun Oil Company of Pennsylvania, Philadelphia, Pa.

[22] Filed: Feb. 11, 1974

[21] Appl. No.: 441,620

[52] U.S. Cl. .................. 328/167; 307/240; 328/63; 324/60 R; 329/122; 329/104

[51] Int. Cl.[2].. H03K 5/20; H04B 1/12; H04B 15/06

[58] Field of Search...... 328/167, 63; 307/240, 233; 329/50, 122; 325/481, 483, 320; 324/60 R, 60 C

[56] References Cited

UNITED STATES PATENTS

| | | | |
|---|---|---|---|
| 3,346,815 | 10/1967 | Haggai | 329/122 |
| 3,424,990 | 1/1969 | Escobosa | 329/50 |
| 3,532,997 | 10/1970 | Faye | 328/167 X |
| 3,550,023 | 12/1970 | Webb | 307/240 X |

*Primary Examiner*—Alfred L. Brody
*Attorney, Agent, or Firm*—George L. Church; Donald R. Johnson; Frank A. Rechif

[57] ABSTRACT

A pair of storage capacitors are switched into a circuit across a source of alternating signals, during respective opposite half-cycles of the signal wave. The voltage utilized for switching is obtained from the output of an oscillator which is synchronized by and with the received signal, if such signal is within the passband of a narrow band pass filter. A noise rejection system may use two circuit arrangements of this type having center frequencies differing slightly. Output may be taken from the common (unswitched) side of the two capacitors, or from the independent (switched) sides thereof, as desired.

12 Claims, 8 Drawing Figures

LOCK-IN FILTER FOR NOISE REJECTION

This invention relates to a lock-in filter which provides optimum noise rejection. The invention has particular utility in systems for telemetering in boreholes.

Systems have previously been developed for telemetering in boreholes, between the surface and an instrument near the drill bit, such systems employing acoustic signals which travel along the drill pipe. Typical of such systems are those described in my copending applications Ser. No. 390,833, filed Aug. 23, 1973; Ser. No. 396,635, filed Sept. 12, 1973; Ser. No. 416,467, filed Nov. 16, 1973.

During drilling, there is normally considerable noise generated by the bit, by rubbing of the drill pipe on the casing, and by machines on the drilling platform. The systems referred to describe the use of repeaters, to compensate fot signal attenuation in the pipe. Each repeater, and also the surface readout, must include noise-rejecting circuits; the effectiveness of the noise rejection determines the possible trade-off between repeater spacing and rate of data transmission.

In the systems referred to, the circuits of the repeaters and surface units incorporate phase-locked loops, to supplement the noise rejection of cascaded active filters. Unfortunately, pulses of noise, characteristic of noise in a long pipe, can cause damped oscillations in the phase-locked loop which prevent it from locking on the coherent signal. Furthermore, the voltage-controlled oscillators of commercial phase-locked loop units are designed to "pull" with the input frequency over a range of about ± 10 Hz, which means that there will be no noise rejection over this range, regardless of the time constant of the voltage-controlled oscillator input lowpass filter.

An object of this invention is to provide a novel filter (frequency-selective) circuit.

Another object is to provide a filter circuit which provides very sharp frequency selectivity at frequencies well within the audio frequency range.

A further object is to provide a novel filter circuit of the so-called lock-in type.

A still further object is to provide a novel circuit for rejecting noise which provides a high order of noise rejection.

Yet another object is to provide a noise rejection circuit which is free from spurious "ringing" in the presence of noise which is many times the signal amplitude.

A detailed description of the invention follows, taken in conjunction with the accompanying drawings, wherein.

Figure 1:
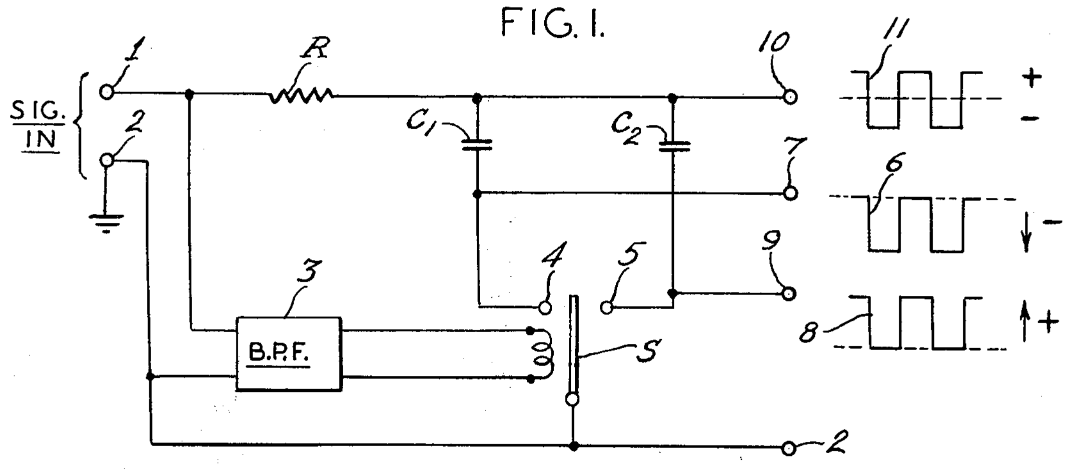
FIG. 1 is a simplified circuit diagram drawn to aid in explaining the essential functions of a lock-in filter circuit according to the invention.

Referring first to FIG. 1, an alternating input signal (assumed to be approximately sinusoidal in form) is applied to the input terminals 1 and 2 (terminal 2 being grounded). This signal is passed through a resistor R to the upper plates of a pair of capacitors $C_1$ and $C_2$; the lower plates of these capacitors are adapted to be alternately connected to ground 2 by means of a single-pole, double-throw switch S. Switch S is operated by the output of a band pass filter 3 which receives its input from the terminals 1 and 2.

If the switch S is switched back and forth at the signal frequency f (within the passband of filter 3), and is always on its contact 4 (associated with capacitor $C_1$ ) during the positive half of the input signal cycle, capacitor $C_1$ will charge over several cycles to a positive potential relative to ground; likewise, capacitor $C_2$ will charge to a negative potential relative to ground, since switch S will be on its contact 5 (associated with capacitor $C_2$ ) during the negative half of the input signal cycle. Thus, a square wave (represented by waveform 6), alternating between ground and a negative voltage, equal to the sum of the voltages across $C_1$ and $C_2$, will be developed at output terminal 7 (switch contact 4, the lower plate of capacitor $C_1$). Likewise, a square wave (represented by waveform 8), alternating between ground and a positive voltage, equal to the sum of the voltages across $C_1$ and $C_2$, will be developed at output terminal 9 (switch contact 5, the lower plate of $C_2$). At output terminal 10 (the upper plates of $C_1$ and $C_2$) the voltage will be a square wave, alternating between the positive and negative voltages on $C_1$ and $C_2$; this is represented by waveform 11.

In the circuit of FIG. 1, if $C_1 = C_2 = C$ and if the product RC is much greater than $1/f$, rapid changes in amplitude of the input signal due to noise cause much smaller changes in the amplitude of the square wave outputs.

For noise frequencies $f \pm \Delta f$ within the pass band, a beat frequency $\Delta f$ is generated between the input and switch frequencies. This frequency is integrated to a small value by the RC time constant of the low pass filter, as either $C_1$ or $C_2$ is always connected to ground.

Frequencies outside the passband are not passed by the filter 3 and hence do not actuate the switch S; these frequencies are attenuated by the RC time constant of the low pass filter.

Figure 2:
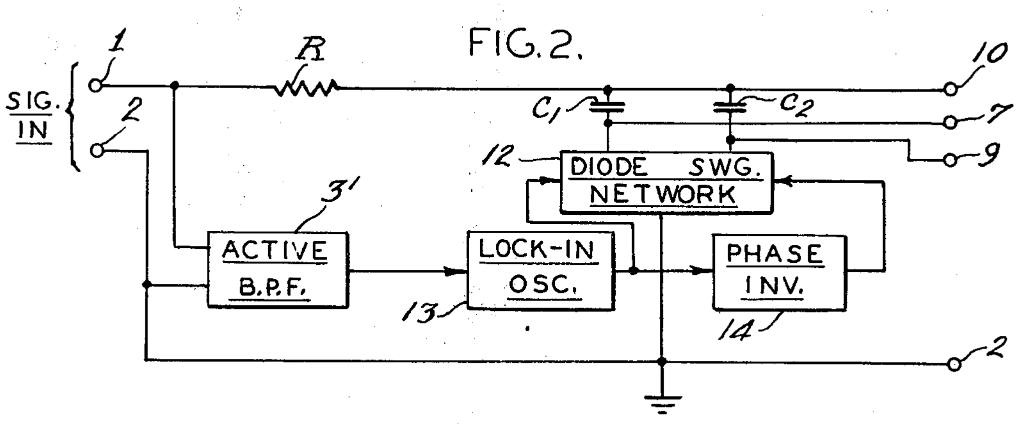
FIG. 2 is a block diagram of a practical lock-in filter.

Refer now to FIG. 2, which is a block diagram of a practical form of the lock-in circuit of the invention. In FIG. 2, the function of the single-pole, double-throw switch S is performed by a diode switching network denoted generally by numeral 12. Band pass filter 3 of FIG. 1 becomes the active band pass filter 3' in FIG. 2. The diode switching network 12 is driven by two square waves, of the same frequency but displaced 180° in phase; one of these square waves is obtained from a lock-in oscillator 13 controlled from the output of filter 3' and the other of these square waves is obtained from the output of a phase inverter 14 which is fed by the output of oscillator 13.

Figure 3:
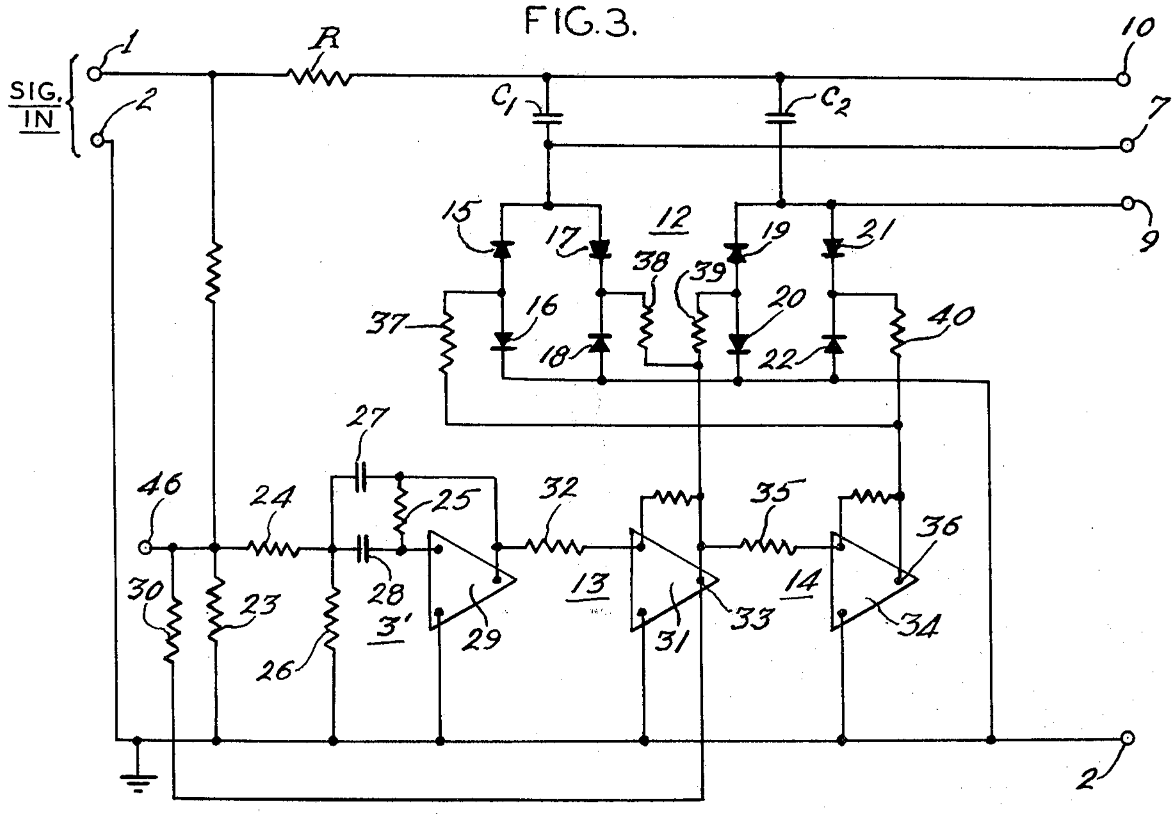
FIG. 3 is a practical form of lock-in filter circuit.

Refer now to FIG. 3, which is a circuit diagram of a practical lock-in circuit according to this invention. The diode switching network 12 comprises eight diodes 15 to 22, four of which are associated with each of the capacitors $C_1$ and $C_2$.

Diodes 15-18 are associated with capacitor $C_1$. Diodes 15 and 16 are connected back-to-back, in series, between the lower plate of capacitor $C_1$ and ground 2;

diodes 17 and 18 are connected back-to-back, in series, between this same plate of capacitor $C_1$ and ground, but diodes 17 and 18 are poled oppositely as compared to diodes 15 and 16.

Diodes 19-22 are associated with capacitor $C_2$. Diodes 19 and 20 are connected back-to-back, in series, between the lower plate of capacitor $C_2$ and ground 2; diodes 21 and 22 are connected back-to-back, in series, between this same plate of capacitor $C_2$ and ground, but diodes 21 and 22 are poled oppositely as compared to diodes 19 and 20.

The active band pass filter 3' is formed by resistors 23, 24, 25, and 26, capacitors 27 and 28, and operational amplifier 29.

With the addition of a feedback resistor 30 coupled from the output of an operational amplifier 31 back to the input of amplifier 29, the resistor 32 and amplifier 31 form an oscillator arrangement 13 essentially similar to that disclosed in my copending application Ser. No. 396,628, filed Sept. 12, 1973. As described in this last-mentioned application, amplifier 31 operates in effect as a saturable amplifier, so that the voltage appearing at the output terminal 33 of this amplifier is a square wave, limited by the supply voltages.

The operational amplifier 34 receives this square wave by way of a resistor 35 and hence develops a square wave of the same frequency, displaced 180° in phase; thus, it forms the phase inverter 14. This phase-displaced square wave appears at the output terminal 36 of amplifier 34.

The two square waves (at 33 and 36) drive the diode switches 12 through isolating resistors 37, 38, 39, and 40. The diodes 15–22 are polarized so that capacitor $C_1$ is grounded when the output at 33 is negative (at this time, the output at 36 will be positive), and capacitor $C_2$ is connected to ground when the output at 33 is positive (at this latter time, the output at 36 will be negative). It may be noted here that this arrangement is exactly opposite to that previously described in connection with FIG. 1 (in FIG. 1, it was assumed that capacitor $C_1$ was connected to ground during the positive half of the signal cycle).

Another significant difference between the complete circuit of FIG. 3 and the simplified circuit of FIG. 1 is the fact that the switch of FIG. 3 may run at a frequency controlled by resistor 26 when no input signal is present at terminals 1 and 2, if the value of resistor 30 is low enough to sustain oscillation. However, no voltage is developed across $C_1$ or $C_2$ under these conditions (since no signal is present at terminals 1 and 2); hence, there will be no output without an input signal of the same frequency.

When a signal of sufficient amplitude and a frequency near the center of the pass band is present at terminals 1 and 2, a portion of this voltage is mixed with the square wave from resistor 30 (derived from output terminal 33), across resistor 23. The oscillator frequency then shifts (this is a lock-in action) until it has the same frequency and phase as the input signal, and integrated square waves then appear at the output terminals 10, 7, and 9.

Figure 4:
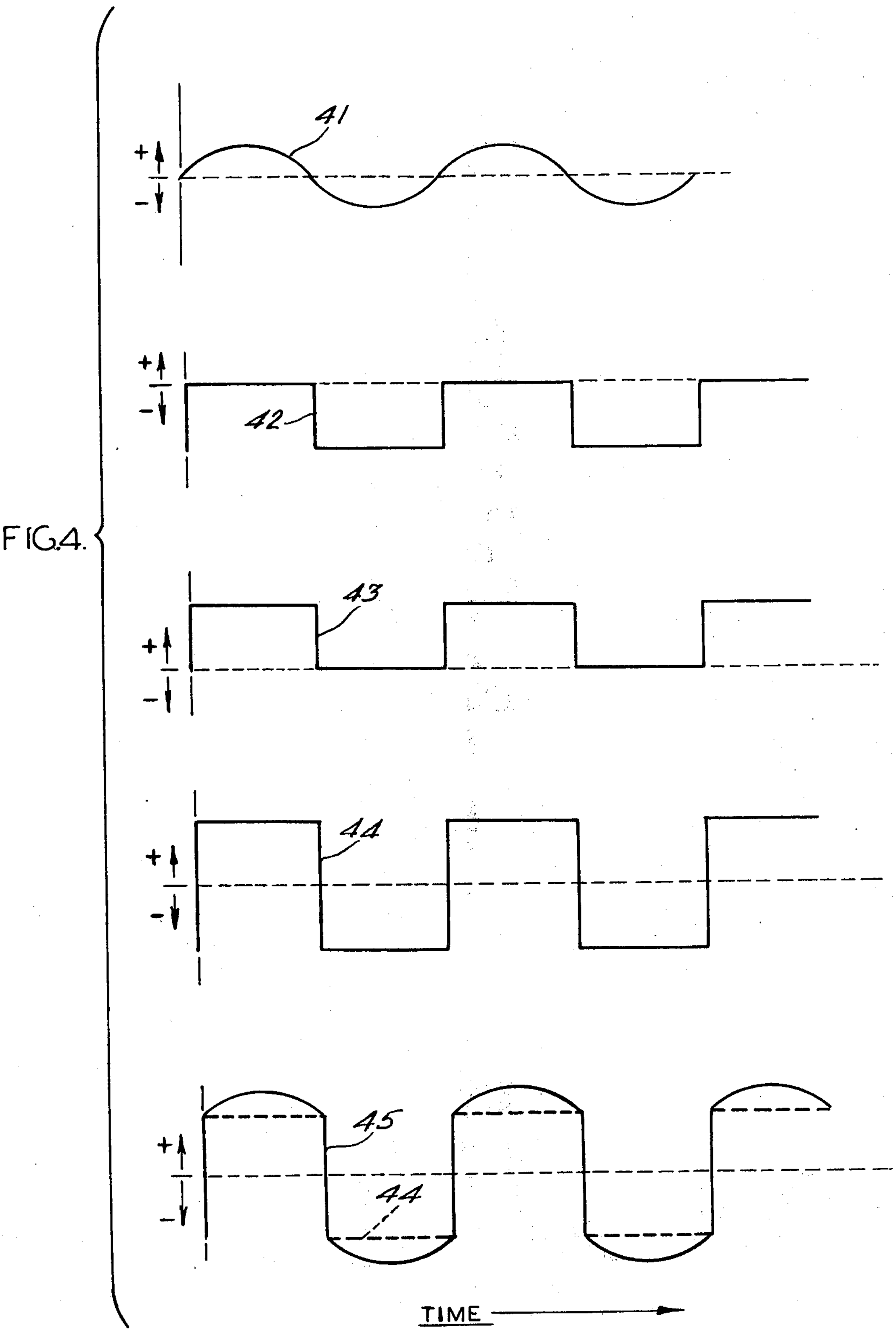
FIG. 4 is a representation of waveforms associated with the circuit of FIG. 3.

Refer now to FIG. 4, which is a series of waveforms associated with the circuit of FIG. 3; these waveforms represent voltages with respect to ground 2, which corresponds to the zero axis of each wave. The uppermost waveform 41 represents the input voltage (signal) at terminal 1; this signal is illustrated as being sinusoidal. Waveform 43 (a square wave at signal frequency) represents the output voltage at terminal 7; this is the voltage at the switched or lower plate of capacitor $C_1$, which alternates between ground and a positive voltage. Waveform 42 (a square wave at signal frequency) represents the output voltage at terminal 9; this is the voltage at the switched or lower plate of capacitor $C_2$, which alternates between ground and a negative voltage. Waveform 44 (again, a square wave at signal frequency) represents the output voltage at terminal 10; this wave alternates between the negative and positive voltages on $C_1$ and $C_2$. Waveform 45 represents the voltage at a terminal 46 which is the common junction of resistors 30, 23, and 24.

Referring again to FIG. 3, when the signal frequency at 1 is shifted toward the edges of the pass band of filter 3', the phase displacement (between the signal and the oscillator output at 33) increases, and the output of the lock-in filter decreases as a cosine function of the phase difference. At ± 60°, the output is down 6 db, and at 90° it is zero.

The center frequency, bandwidth, and skirt slope of the lock-in filter of this invention are almost independently controlled by three resistors. Resistor 26 controls the center frequency, resistor 24 governs the bandwidth, and resistor 30 determines the skirt slope.

Figure 5:
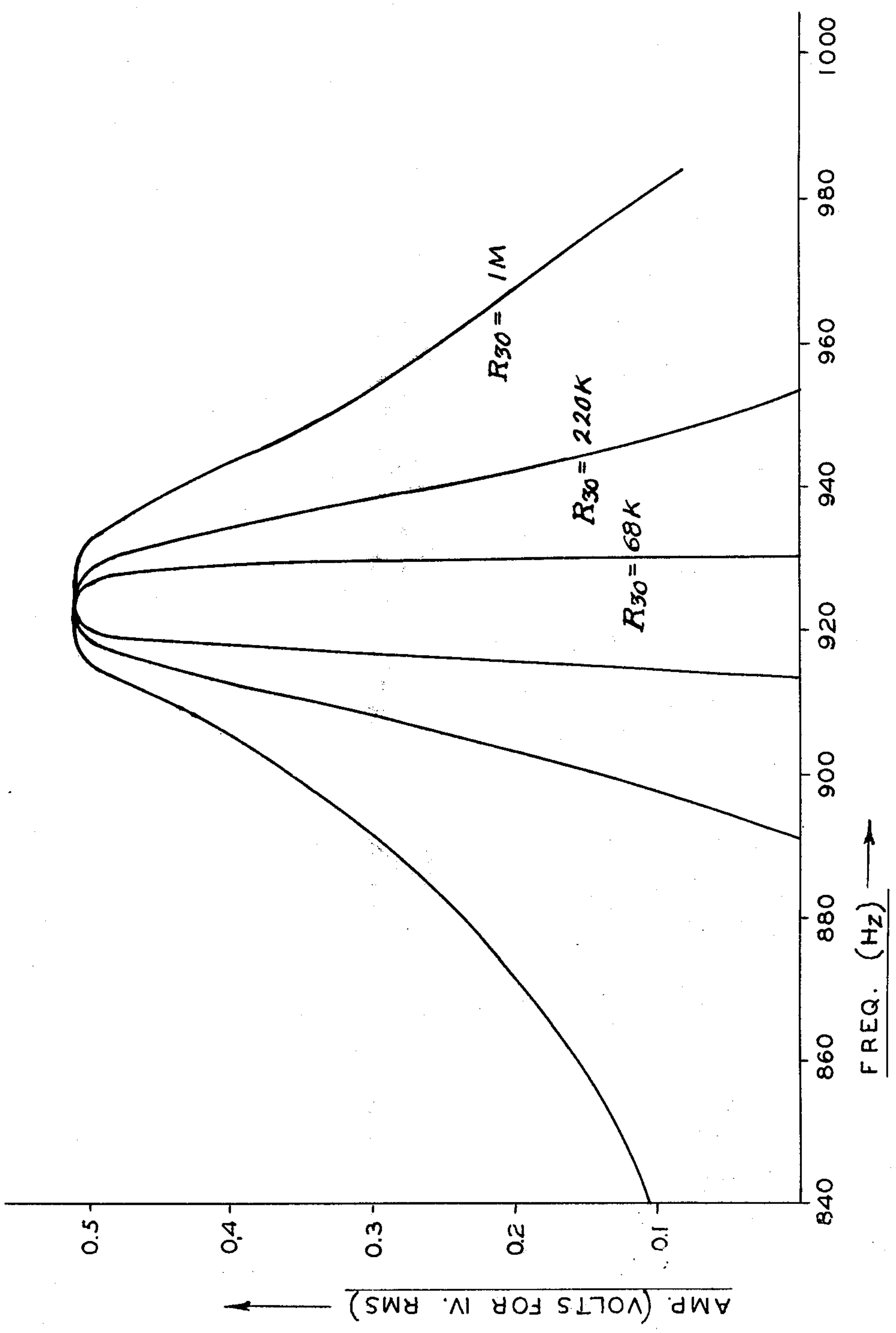
FIG. 5 is a family of curves illustrating the measured selectivities of lock-in circuits according to the invention.

FIG. 5 provides a typical family of curves with different skirt selectivities (the curves being given for three different values of resistor 30, as indicated adjacent to each curve). A (3 db down) pass band 10 Hz wide at 920 Hz (as depicted by the central or innermost curve in FIG. 5), with nearly vertical skirts, is stable, and free from "ringing" effects.

If the signal amplitude is comparable with the diode switching voltage, the oscillator may remain synchronized with the signal frequency beyond the 90° points. The result is a small output voltage of reversed polarity which vanishes at the limits of the pass band of the active filter 3'. This effect can be minimized by automatic gain control or amplitude limiting ahead of the lock-in filter. Spurious effects due to harmonics may be eliminated by inserting a conventional band pass filter before the lock-in filter. (Ideally, the signal amplitude should be less than the diode switching voltage.)

Figure 6:
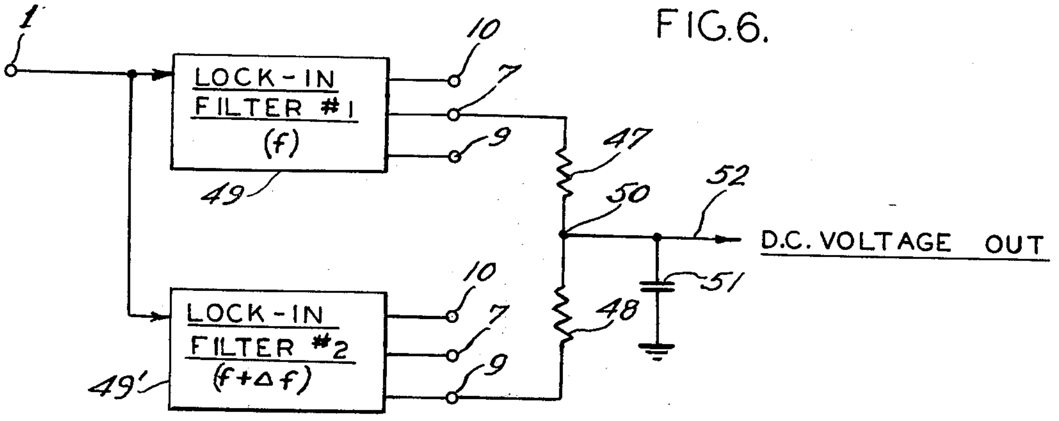
FIG. 6 is a block diagram of a noise cancellation system using two lock-in filters.

Refer now to FIG. 6, which illustrates the basic principles of a noise rejection system using two lock-in filters of the invention for noise cancellation. In the basic but detailed circuit of FIG. 3, the voltage at terminal 9 is always negative with respect to ground for an input signal within the pass band, and the voltage at terminal 7 is always positive with respect to ground (see waveforms 42 and 43, respectively, in FIG. 4). A transient noise burst including frequencies in the pass band can only cause voltages across $C_1$ and $C_2$ of these polarities. The magnitude of the voltage depends on the amplitudes in the noise of frequencies persisting an appreciable fraction of the RC time constant.

In FIG. 6, the input signal, applied to terminal 1 as before, is fed in parallel to a first lock-in filter 49 having a center frequency f, and to a second lock-in filter 49' having a center frequency $f+\Delta f$, where $\Delta f$ is the frequency shift of an applied (incoming) frequency shift keyed signal. The lock-in filters 49 and 49' may each be of the practical form previously described (block diagram in FIG. 2, and detailed circuit diagram in FIG. 3). The output terminal 7 of unit 49 is coupled over a resistor 47 to a combining point 50, and the output terminal 9 of unit 49' is coupled over a resistor 48 to this same point 50. A capacitor 51 of large capacitance value is connected between point 50 and ground, and the voltage output is taken by way of a lead 52 connected to point 50 (i.e., to capacitor 51).

In a white noise spectrum, the average noise voltages at output terminals 7 and 9 of FIG. 3 must be equal in magnitude and opposite in polarity. Hence, the net noise voltage across capacitor 51 of FIG. 6 must approach zero for a sufficiently large capacitance at 51. The ratio of $R_{47}$ to $R_{48}$ is adjusted for optimum noise cancellation.

The demodulated FSK signal at 52 is a polarity reversal across capacitor 51. It is a d.c. signal, being positive for one frequency $f$ and negative for the other, $f+\Delta f$. The value of $C_{51}$ provides a trade-off between noise rejection and signal rate.

The lock-in filter described herein can replace the phase-locked loops shown in previous repeater and surface receiver circuits (such as those shown in certain of the aforemetioned applications, for example), with improved noise rejection. The block diagrams of FIGS. 7 and 8 show general arrangements of such circuits.

Figure 7:
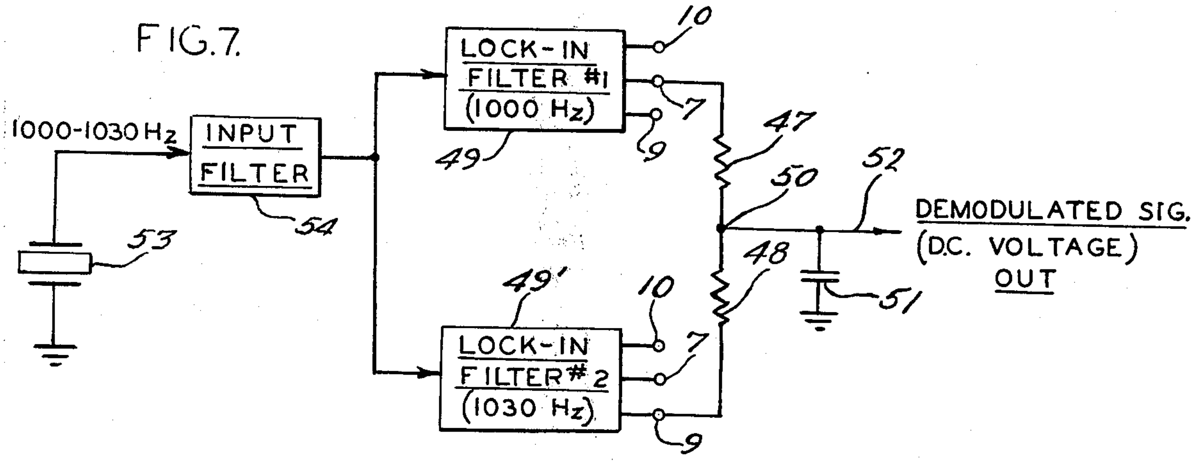
FIG. 7 is a block diagram of a surface receiver using the noise cancellation system of FIG. 6.
Figure 8:
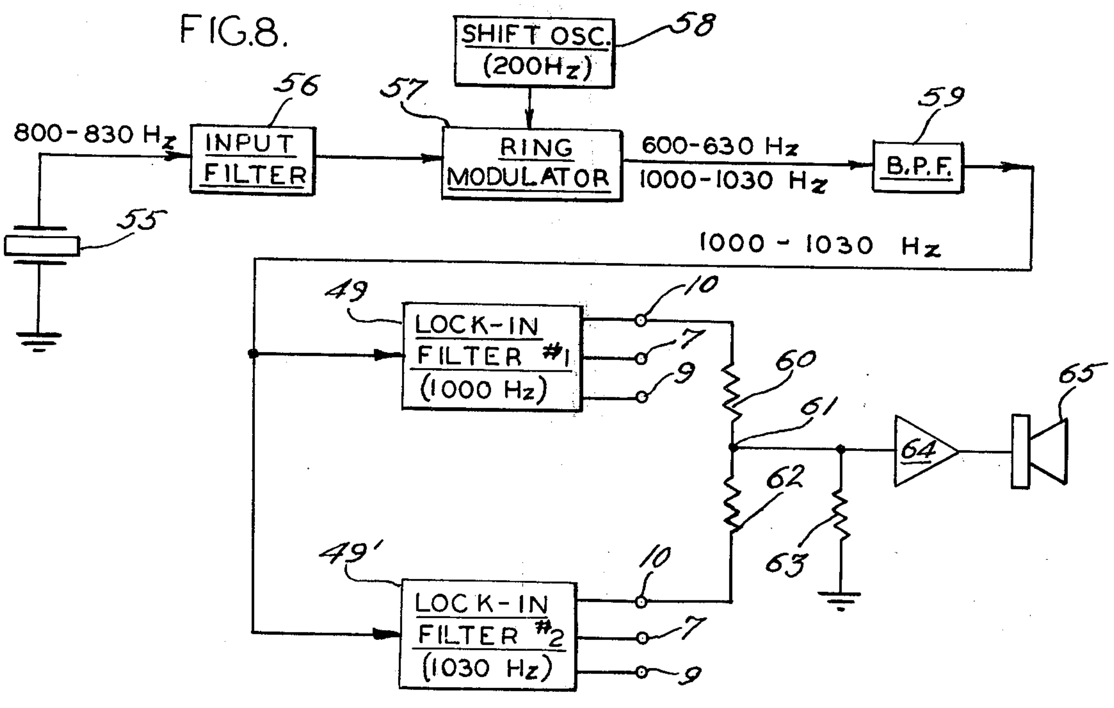
FIG. 8 is a block diagram of a repeater employing lock-in filters of the invention.

Refer first to FIG. 7, wherein a surface receiver arrangement is depicted. This arrangement utilizes the noise rejection system of FIG. 6 to demodulate the FSK signal. A signal pickup at the surface, illustrated as a piezoelectric crystal 53, picks up the FSK signal (assumed, for illustrative purposes, to be an acoustic signal shifted back and forth between 1000 Hz and 1030 Hz) and feeds it to an input filter 54, which may be a band pass filter of active type.

The filter 54 is adapted to pass a frequency band which includes the incoming signal frequency band of 1000–1030 Hz, and the output of this filter is fed in parallel to a lock-in filter 49 (of the form illustrated in FIG. 3), having a center frequency of 1000 Hz, and to a second lock-in filter 49' (also of the form illustrated in FIG. 3), having a center frequency of 1030 Hz.

The output circuit arrangement includes resistors 47 and 48 and capacitor 51, coupled to terminal 7 of lock-in filter 49 and to terminal 9 of lock-in filter 49' in the same manner as described previously in connection with FIG. 6.

The surface receiver of FIG. 7 must reject considerable noise from machinery on the drilling platform (assuming that the FIG. 7 circuit is being used at the surface in a borehole telemetering system, as in the aforementioned copending applications), and also demodulate the carrier to recover the information transmitted. By mixing the positive output of filter 49' at one FSK frequency (1030 Hz) with the negative output of filter 49 at the other FSK frequency (1000 Hz), both required functions result. This has been explained previously, in connection with FIG. 6. There is a high order of noise cancellation, and the FSK signal is demodulated as a positive d.c. output voltage for one frequency and a negative d.c. output voltage for the other.

Refer now to FIG. 8, which depicts a repeater circuit (again assumed to be used in a borehole telemetering system). The repeater circuit is generally similar to that disclosed in copending application Ser. No. 390,833. In such repeater, the signal information is shifted to a different carrier frequency, without alteration. Information is transmitted by pulse width modulation or digital coding, requiring a frequency shift of about 30 Hz on a carrier which may for example be 800, 1000, or 1200 Hz.

In the circuit of FIG. 8, the incoming carrier is assumed to be at 800 Hz, frequency shift keyed between 800 and 830 Hz in accordance with the signal information. A signal pickup, illustrated as a piezoelectric crystal 55, picks up the FSK signal and feeds it to an input filter 56, which may be a band pass filter of active type. Filter 56 is adapted to pass a frequency band which includes the incoming signal frequency band of 800–830 Hz, and the output of this filter is fed to a ring modulator 57, to which is also fed heterodyning oscillatory energy of 200 Hz from a shift oscillator 58.

As indicated in FIG. 8, the output of modulator 57 contains sidebands of 600–630 Hz and 1000–1030 Hz; this output is fed to an active band pass filter 59, which selects and passes the 1000–1030 Hz sideband. This sideband is fed in parallel to a lock-in filter 49 (circuit as in FIG. 3; center frequency 1000 Hz), and to a lock-in filter 49' (circuit as in FIG. 3; center frequency 1030 Hz).

The output terminal 10 of unit 49 (at which there is developed a wave like 44 when the frequency at its input is 1000 Hz) is coupled over a resistor 60 to a combining point 61, and the output terminal 10 of unit 49' (at which there is developed a wave like 44 when the frequency at its input is 1030 Hz) is coupled over a resistor 62 to this same point 61. A resistor 63 is connected between point 61 and ground, and the voltage across this latter resistor is fed through an operational amplifier 64 to drive an acoustic signal source (sound source) 65.

Thus, in the circuit of FIG. 8, the incoming FSK signal is shifted to a different carrier frequency and retransmitted (as per waveform 44, FIG. 4), while providing a high order of noise cancellation (due to the action of the lock-in filters 49 and 49').

The invention claimed is:

1. A lock-in circuit comprising a pair of terminals receptive of a noise-infested alternating signal voltage of unknown frequency and generated by a remote source, a pair of storage capacitors adapted to become charged from said voltage, means acting in response to said signal to connect one of said capacitors across said terminals to be charged during the positive half-cycles of said signal voltage and to connect the other of said capacitors across said terminals to be charged during the negative half-cycles of said signal voltage, and means for utilizing the voltages appearing on said capacitors.

2. Circuit of claim 1, including also frequency-selective means for applying to the first-mentioned means only signals lying within a preselected passband.

3. Circuit defined in claim 1, wherein the first-mentioned means includes switching means for selectively connecting said capacitors across said terminals, and means controlled by said signal for operating said switching means.

4. Circuit defined in claim 1, wherein the first-mentioned means includes a diode switching network operable to selectively connect said capacitors across said terminals, and means responsive to said signal for developing an operating voltage for said network.

5. Circuit according to claim 4, including also frequency-selective means for applying to the developing means only signals lying within a preselected passband.

6. Circuit set forth in claim 4, wherein the developing means includes a lock-in oscillator, means for locking the oscillator frequency to that of said signal, and means for utilizing the oscillator output as an operating voltage for the diode switching network.

7. Circuit set forth in claim 6, wherein the locking means includes a band pass filter connected in the signal path between said terminals and said oscillator.

8. A lock-in circuit comprising a pair of terminals receptive of an alternating signal voltage, a pair of storage capacitors adapted to become charged from said voltage, voltage-operated switching means for selectively connecting said capacitors across said terminals, a lock-in oscillator, means for locking the oscillator frequency to that of said signal, and means fo r utilizing the oscillator output as an operating voltage for said switching means.

9. Circuit defined in claim 8, wherein the locking means includes a band pass filter connected in the signal path between said terminals and said oscillator.

10. Circuit of claim 8, including also means for utilizing the voltages appearing on said capacitors.

11. Circuit defined in claim 8, wherein said switching means acts to connect one of said capacitors across said terminals to be charged during the positive half-cycles of said signal voltage and to connect the other of said capacitors across said terminals to be charged during the negative half-cycles of said signal voltage.

12. Circuit according to claim 11, including also means for utilizing the voltages appearing on said capacitors.

* * * * *